United States Patent
DiRisio et al.

[11] Patent Number: 6,049,675
[45] Date of Patent: Apr. 11, 2000

[54] ONE-TIME-USE CAMERA WITH ANTI-BACKUP PAWL ENGAGING FILM WINDER RESPONSIVE TO FILM LOADING

[75] Inventors: Anthony DiRisio; Joel S. Lawther, both of Rochester, N.Y.

[73] Assignee: Eastman Kodak Company, Rochester, N.Y.

[21] Appl. No.: 09/234,602

[22] Filed: Jan. 21, 1999

[51] Int. Cl.[7] .............................. G03B 17/02; G03B 1/00
[52] U.S. Cl. .............................. 396/6; 396/395; 396/396; 396/411; 396/538
[58] Field of Search .............................. 396/6, 395, 396, 396/411, 413, 535, 538

[56] References Cited

U.S. PATENT DOCUMENTS

| | | | |
|---|---|---|---|
| 554,769 | 2/1896 | Brownell | 242/118.62 |
| 579,949 | 4/1897 | Brownell | 396/385 |
| 1,050,785 | 1/1913 | Austin et al. | 242/118.4 |
| 1,144,267 | 6/1915 | VanSickle et al. | 396/502 |
| 4,991,786 | 2/1991 | Cloutier et al. | 396/512 |
| 5,063,400 | 11/1991 | Takei et al. | 356/6 |
| 5,202,713 | 4/1993 | Nakai et al. | 396/6 |
| 5,329,330 | 7/1994 | Sakai et al. | 396/6 |
| 5,349,410 | 9/1994 | Kamata | 396/6 |
| 5,453,804 | 9/1995 | Norris et al. | 396/31 |
| 5,471,270 | 11/1995 | Balling | 396/411 |
| 5,517,270 | 5/1996 | Balling | 396/536 |
| 5,550,608 | 8/1996 | Smart et al. | 396/538 |
| 5,555,055 | 9/1996 | Stephenson, III | 396/395 |
| 5,579,070 | 11/1996 | Smart et al. | 356/538 |
| 5,581,316 | 12/1996 | Kamoda et al. | 396/6 |
| 5,581,321 | 12/1996 | Boyd | 396/535 |
| 5,608,485 | 3/1997 | Kataoka et al. | 396/514 |
| 5,634,160 | 5/1997 | Lee | 396/395 |
| 5,682,570 | 10/1997 | Wakabayashi | 396/536 |
| 5,689,745 | 11/1997 | Zander et al. | 396/429 |
| 5,761,542 | 6/1998 | Lamphron et al. | 396/6 |
| 5,802,401 | 9/1998 | Sangregory et al. | 396/6 |

*Primary Examiner*—Eddie C. Lee
*Attorney, Agent, or Firm*—Roger A. Fields

[57] ABSTRACT

A subassembly for a one-time-use camera includes a main body part that has a film take-up chamber adapted to receive a film spool and a film supply chamber for an unexposed film roll, a film winding thumbwheel supported for winding rotation in engagement with the film spool to similarly rotate the film spool to take up an exposed filmstrip, and an anti-backup pawl engageable with the thumbwheel to prevent unwinding rotation of the thumbwheel and disengageable from the thumbwheel to allow unwinding rotation of the thumbwheel to permit the film spool to be similarly rotated to unwind a fresh exposed filmstrip from the film spool to form the unexposed film roll. The film take-up chamber is configured to allow the film spool to be received in the film take-up chamber in a film unwinding position for unwinding rotation of the film spool and a different film winding position for winding rotation of the film spool. The anti-backup pawl has an actuator which when actuated disengages the anti-backup pawl from the thumbwheel and which is located in the film take-up chamber to allow the film spool when received in the film take-up chamber in the film unwinding position to actuate the actuator to disengage the anti-backup pawl from the thumbwheel, but not when the film spool is received in the film take-up chamber in the film unwinding position.

7 Claims, 7 Drawing Sheets

ONE-TIME-USE CAMERA WITH ANTI-BACKUP PAWL ENGAGING FILM WINDER RESPONSIVE TO FILM LOADING

CROSS REFERENCE TO RELATED APPLICATIONS

Reference is made to commonly assigned copending applications Ser. No. 09/234,867, entitled METHOD OF DISENGAGING ANTI-BACKUP PAWL FROM FILM WINDER TO PERMIT UNEXPOSED FILMSTRIP TO BE PREWOUND FROM FILM CARTRIDGE DURING MANUFACTURE OF ONE-TIME-USE CAMERA and filed Jan. 24, 1999 in the names of Randy E. Horning & James G. Rydelek and Ser. No. 09/234,954, entitled ONE-TIME-USE CAMERA WITH ANTI-BACKUP PAWL DISENGAGED FROM FILM WINDER DURING FILM LOADING and filed Jan. 24, 1999 in the name of Anthony DiRisio.

The cross-referenced applications are incorporated in this application.

FIELD OF THE INVENTION

The invention relates generally to the field of photography, and in particular to one-time-use cameras. More specifically, the invention relates to a one-time-use camera with an anti-backup pawl that is disengaged from a film winding thumbwheel responsive to film loading

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a film take-up chamber, an unexposed film roll prewound on a film spool in a film supply chamber from the film cartridge, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the film take-up chamber. Then, he removes the exposed filmstrip from the film cartridge to develop the negatives and make prints for the customer. At least some of the used camera parts may be recycled, i.e. reused, to remanufacture the camera.

Problem

A resilient anti-backup pawl for the film winding thumbwheel engages the thumbwheel to prevent rotation of the thumbwheel in a film unwinding direction when the shutter release button is manually depressed and the metering lever is pivoted out of engagement with the thumbwheel.

During original manufacture of the one-time-use camera, the filmstrip is prewound from the film cartridge onto the film spool in the film supply chamber to form the unexposed film roll on the film spool. The anti-backup pawl must then be disengaged from the thumbwheel to permit the thumbwheel to be rotated in the film unwinding direction. Typically, the anti-backup pawl is held separated from the thumbwheel, and a rotation tool coaxially engaged with the film spool in the film supply chamber is rotated to prewind the filmstrip onto the film spool.

The Cross-Referenced Applications

The incorporated cross-referenced application Ser. No. 09/234,867, entitled METHOD OF DISENGAGING ANTI-BACKUP PAWL FROM FILM WINDER TO PERMIT UNEXPOSED FILMSTRIP TO BE PREWOUND FROM FILM CARTRIDGE DURING MANUFACTURE OF ONE-TIME-USE CAMERA discloses a method of disengaging an anti-backup pawl from a film winding thumbwheel to permit an unexposed filmstrip to be prewound from a film cartridge during manufacture of a one-time-use camera. The method comprises the steps of:

depressing a movable free end of the anti-backup pawl to pivot the anti-backup pawl at a fulcrum support between the free end and a movable opposite end of the anti-backup pawl that engages the film winding thumbwheel, in order to disengage the opposite end from the film winding thumbwheel; and holding the free end depressed to maintain the opposite end disengaged from the film winding thumbwheel, in order to permit the film winding thumbwheel to be rotated in engagement with a film spool in the film cartridge when the unexposed filmstrip is prewound from the film cartridge.

The incorporated cross-referenced application Ser. No. 09/234,954, entitled ONE-TIME-USE CAMERA WITH ANTI-BACKUP PAWL DISENGAGED FROM FILM WINDER DURING FILM LOADING discloses a one-time-use camera comprising a main body part that has a film take-up chamber adapted to receive a film spool and a film supply chamber for an unexposed film roll, a film winding thumbwheel supported for winding rotation in engagement with the film spool to similarly rotate the film spool to take up an exposed filmstrip, and an anti-backup pawl normally engaging the thumbwheel to prevent unwinding rotation of the thumbwheel and disengageable from the thumbwheel to allow unwinding rotation of the thumbwheel to permit the film spool to be similarly rotated to unwind a fresh unexposed filmstrip from the film spool to form the unexposed film roll. The film take-up chamber is configured to allow the film spool to be received in the film take-up chamber in a film unwinding position for unwinding rotation of the film spool and to be in a different film winding position for winding rotation of the film spool. An actuator is movable to disengage the anti-backup pawl from the thumbwheel, and is located to be moved to disengage the anti-backup pawl from the thumbwheel in response to the film spool being received in the film take-up chamber in the film unwinding position and not when the film spool is in the film take-up chamber in the film winding position.

SUMMARY OF THE INVENTION

According to one aspect of the invention, a subassembly for a one-time-use camera comprising a main body part that has a film take-up chamber adapted to receive a film spool, a film winding thumbwheel supported for winding rotation in engagement with the film spool to similarly rotate the film spool to take up an exposed filmstrip, and an anti-backup pawl engageable with the thumbwheel to prevent unwinding rotation of the thumbwheel, is characterized in that:

an actuator is movable to engage the anti-backup pawl with the thumbwheel, and is located to be moved to engage the anti-backup pawl with the thumbwheel in response to the film spool being received in the film take-up chamber.

More specifically, the film take-up chamber is configured to allow the film spool to be received in the film take-up chamber in a film unwinding position for unwinding rotation of the film spool and a different film winding position for winding rotation of the film. The anti-backup pawl is located to be moved to engage with the thumbwheel in response to the film spool being received in the film take-up chamber in the film winding position and not when the film spool is received in the film take-up chamber in the film unwinding position.

According to another aspect of the invention, a method of engaging an anti-backup pawl with a film winding thumbwheel to prevent unwinding rotation of the thumbwheel in a one-time-use camera comprises the steps of:

inserting a film spool in the camera; and moving the film spool into rotational engagement with the film winding thumbwheel and against an actuator to move the actuator to engage the anti-backup pawl with the thumbwheel.

DETAILED DESCRIPTION OF THE INVENTION

Figure 1:
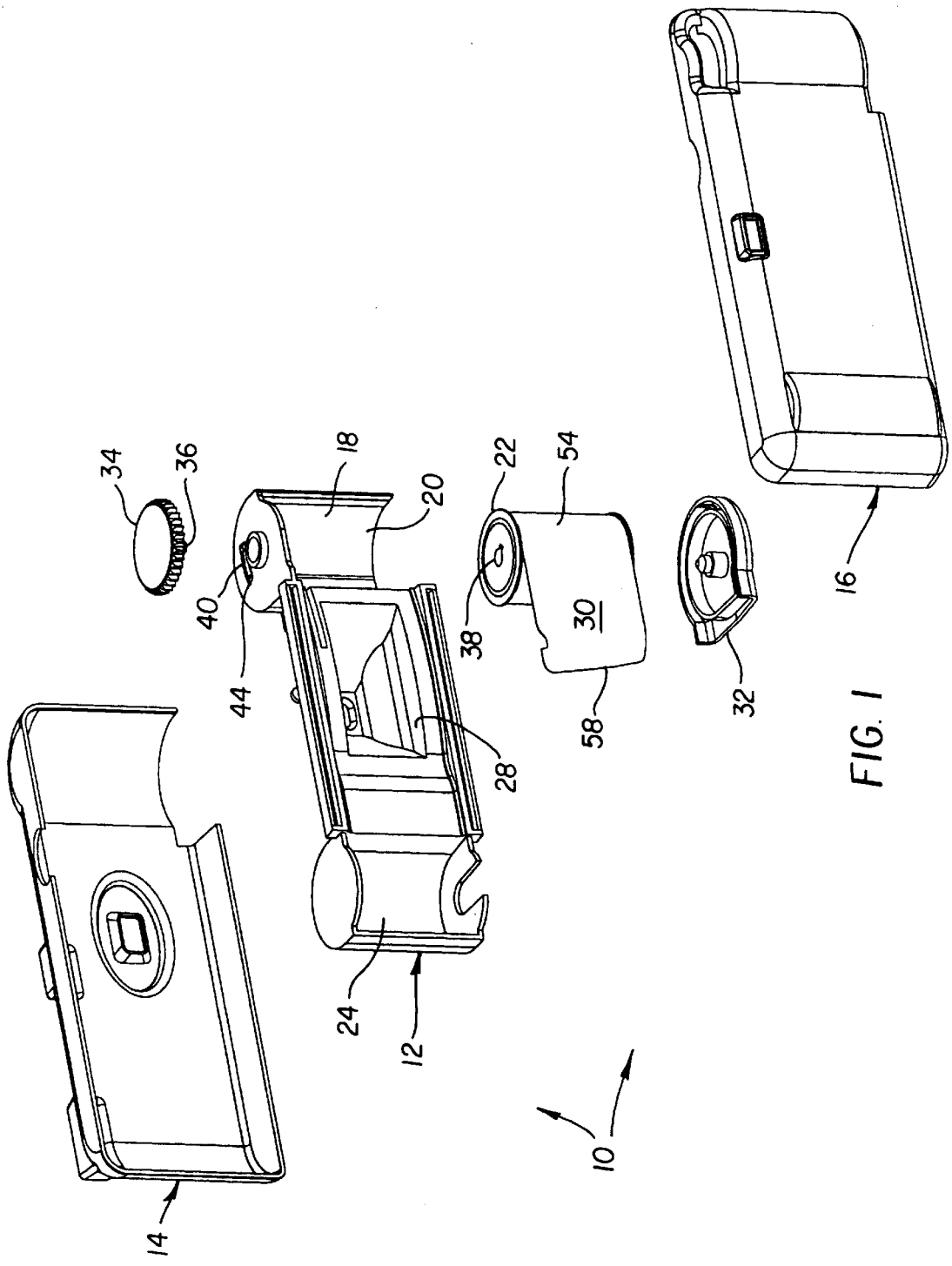
FIG. 1 is an exploded rear perspective view of a one-time-use camera consistent with a preferred embodiment of the invention.
Figure 2:
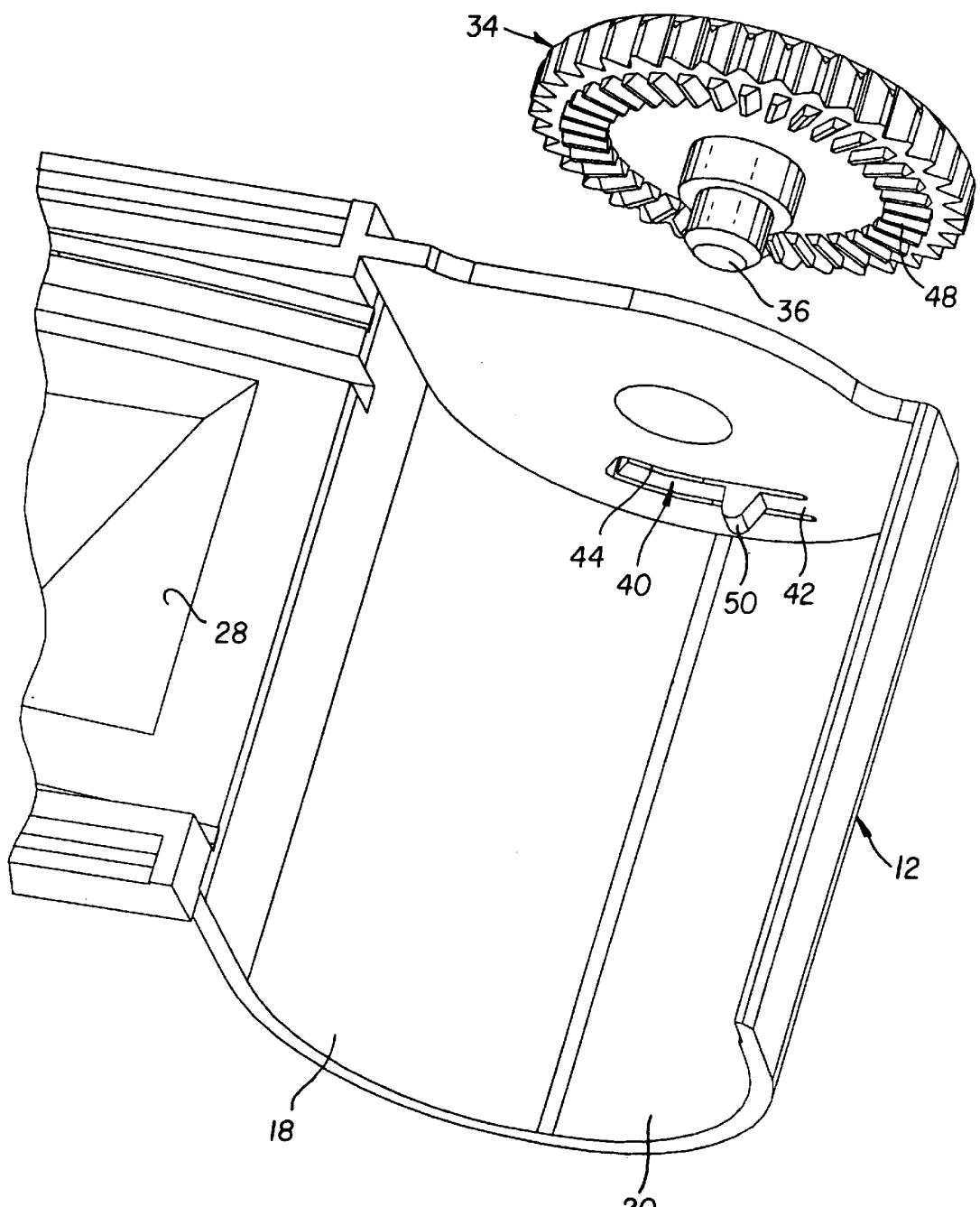
FIG. 2 is an exploded rear perspective view of a film winding thumbwheel, an anti-backup pawl and a film take-up chamber in the camera.
Figure 3:
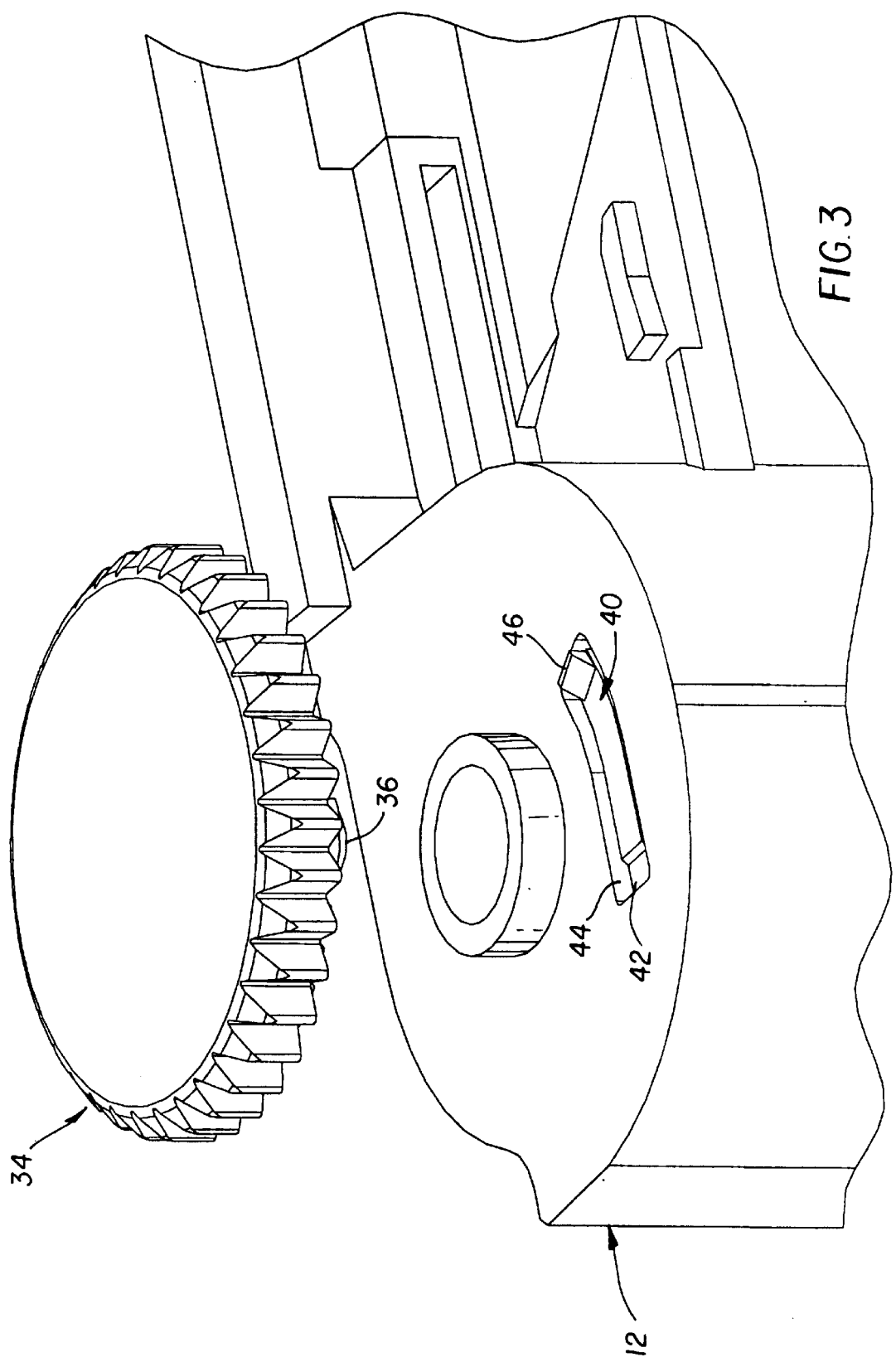
FIG. 3 is an exploded front perspective view of the film winding thumbwheel, the anti-backup pawl and the film take-up chamber in the camera.
Figure 4:
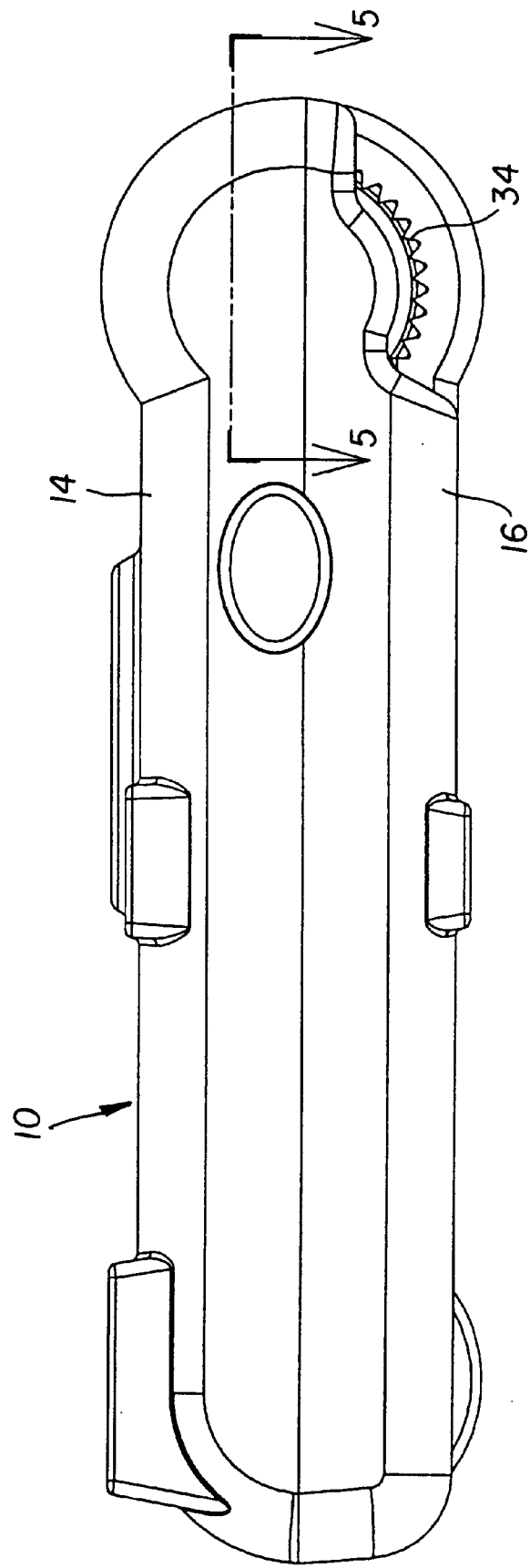
FIG. 4 is a top plan view of the camera.

The invention is disclosed as being embodied preferably in a onetime-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–7 show a one-time-use camera 10 in which an opaque plastic main body part 12 is housed in a pair of opaque plastic front and rear cover parts 14 and 16. The front and rear cover parts 14 and 16 are connected to one another and to the main body part 12 via known hook-in-hole connections (not shown).

The main body part 12 has a film take-up chamber 18 with a bottom loading opening 20 through which a film spool 22 is inserted into the chamber, a film supply chamber 24 for an unexposed film roll 26, and a backframe opening 28 located between the film take-up chamber and the film supply chamber for exposing successive imaging sections of a filmstrip 30. See FIGS. 1 and 6. An end cap or bottom lid 32 is releasably connected to the main body part 12 over the bottom opening 20 to close the film take-up chamber 18. A film winding thumbwheel 34 is rotatably supported on the main body part 12 and has a depending coaxial stem 36 received in an end opening 38 of the film spool 22 to rotationally engage the film spool. Manual winding rotation of the thumbwheel 34 counter-clockwise in FIG. 1 similarly rotates the film spool 22 to wind each exposed section of the filmstrip 30 onto the film spool.

Figure 7:
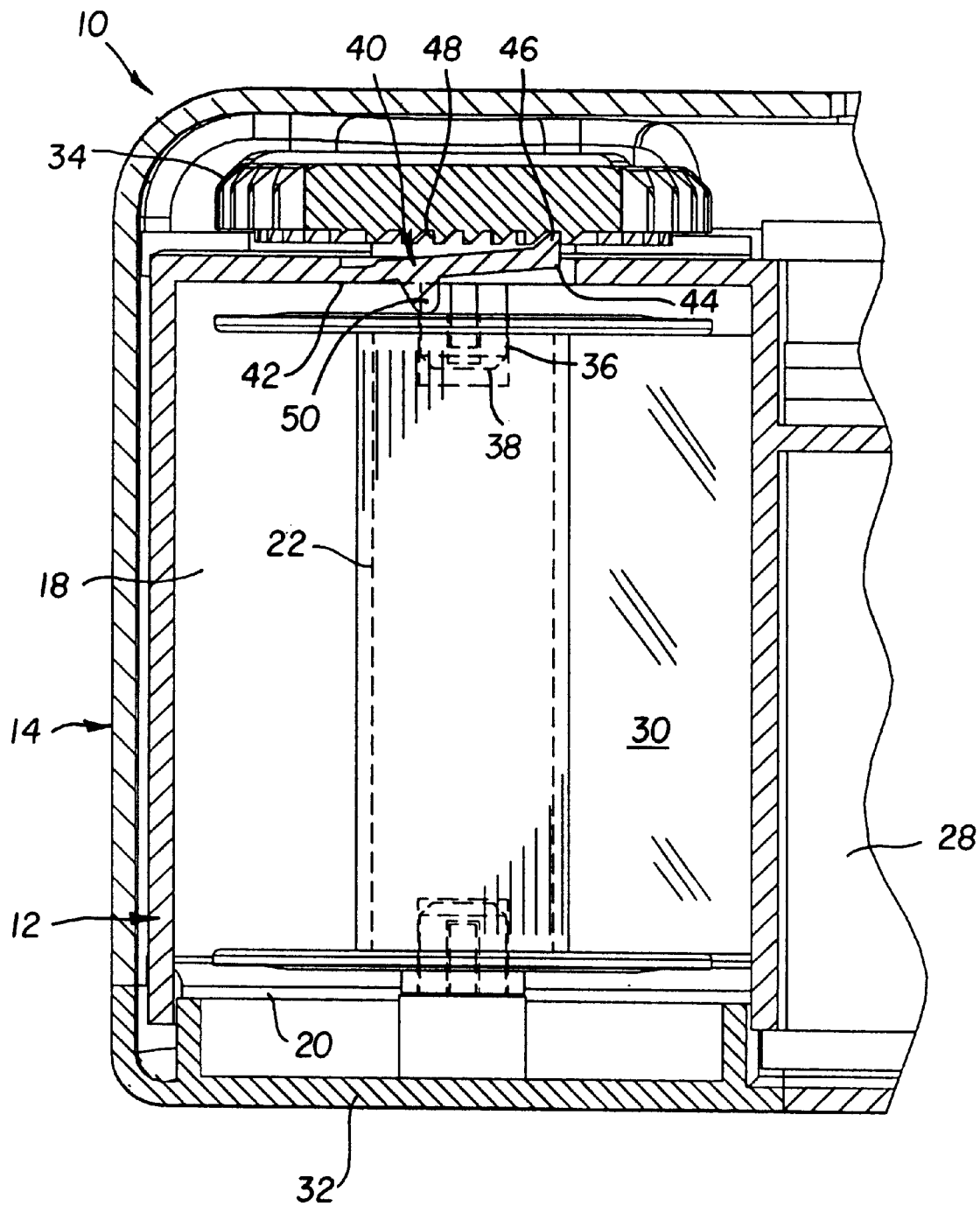
FIG. 7 is a sectional view as seen in the direction of the arrows in FIG. 4, showing the anti-backup pawl engaged with the thumbwheel.

An inherently flexible anti-backup pawl 40 is a cantilever having a support end portion 42 integrally connected with the main body part 12 within a top hole 44 in the main body part. The anti-backup pawl 40 is inherently biased to urge a pawl end 46 out of engagement with respective teeth 48 on the underside of the film winding thumbwheel 34 to allow unwinding rotation of the thumbwheel clockwise in FIGS. 1–3. See FIG. 5. An actuator 50 proximate the support end portion 42 of the anti-backup pawl 40 protrudes into the film take-up chamber 20. When the actuator 50 is pushed towards the top hole 44 as shown in FIG. 7, the anti-backup pawl 40 is pivoted at the support end portion 42 to engage the pawl end 46 with any one of the teeth 48 to prevent unwinding rotation of the thumbwheel 34.

A method of loading fresh film in the one-time-use camera 10 begins with the front cover part 14 connected to the main body part 12, and the rear cover part 16 and the end cap or bottom lid 32 separated from the main body part. The method in sequential steps is as follows.

1. An unexposed film roll 54 is wound onto the film spool 22 and the film spool with the unexposed film roll is inserted through the bottom loading opening 20 into the film take-up chamber 18.

2. The film spool 22 with the unexposed film roll 54 is inserted into the film take-up chamber 18 to a film unwinding position, shown in FIGS. 5 and 6, in which the depending coaxial stem 36 of the film winding thumbwheel 34 is received in the end opening 38 of the film spool 22 to rotationally engage the film spool. The film spool 22 in the film unwinding position is not moved against the actuator 50 to pivot the anti-backup pawl 40 at the support end connection 42 to engage the pawl end 46 with any one of the teeth 48 on the underside of the film winding thumbwheel 34. Thus, the thumbwheel 34 remains free for unwinding rotation with the film spool 22.

Figure 5:
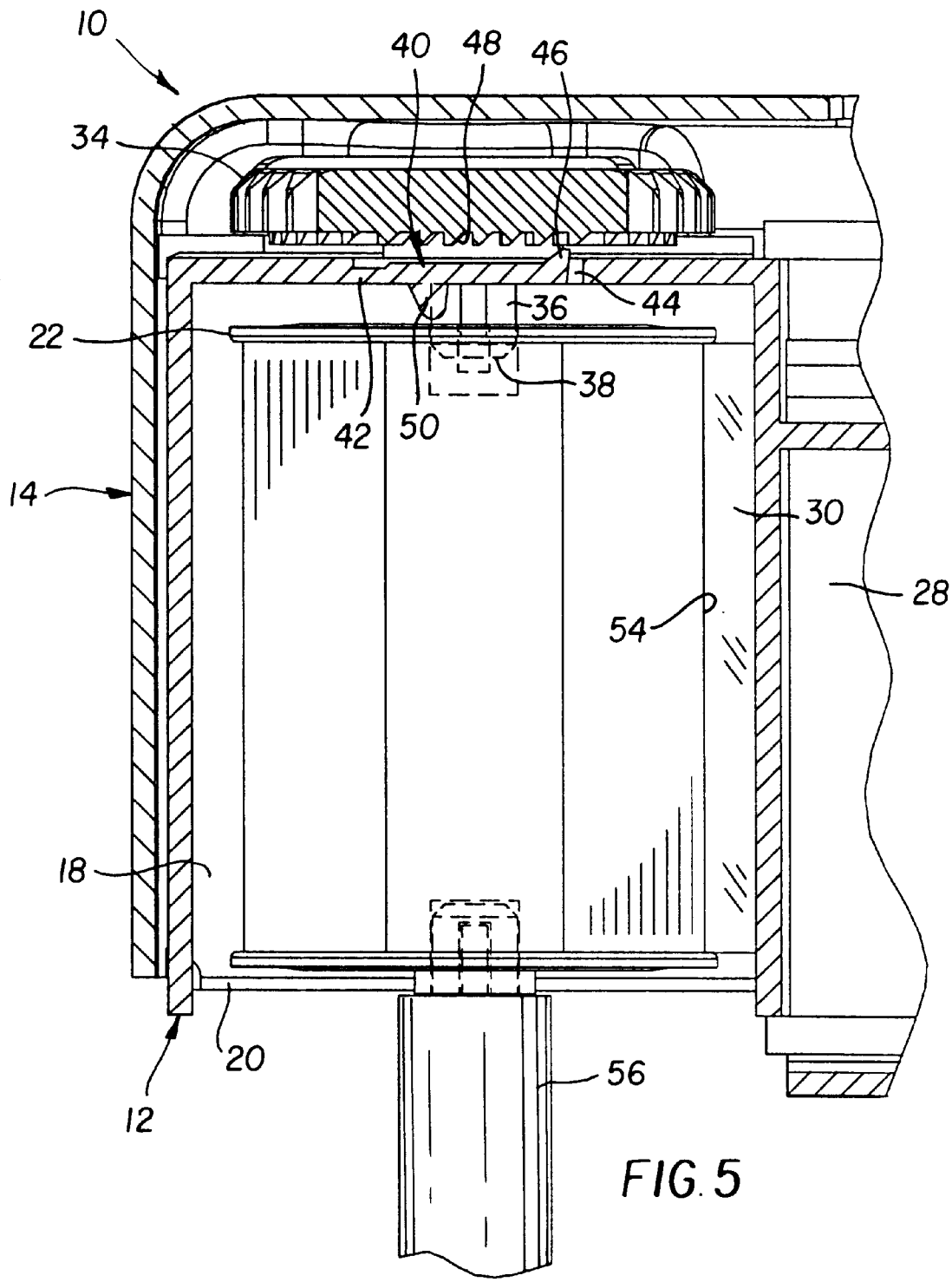
FIG. 5 is a sectional view as seen in the direction of the arrows in FIG. 4, showing the anti-backup pawl disengaged from the thumbwheel.
Figure 6:
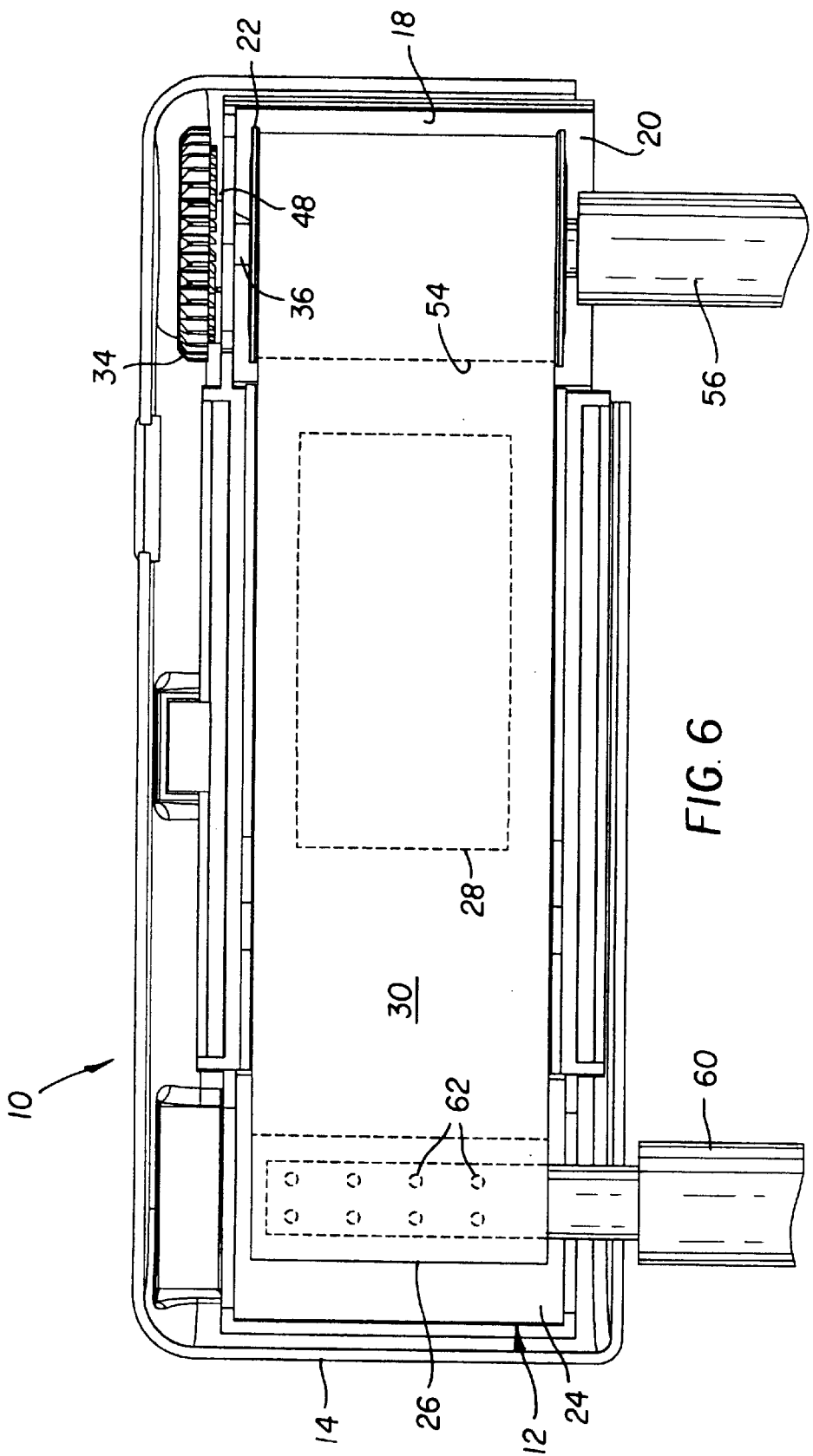
FIG. 6 is a rear elevation view of the camera with a rear cover part removed.

3. A rotation tool 56 is coaxially engaged with the film spool 22, as shown in FIG. 5, and is rotated clockwise in that FIG. less than 360 degrees to similarly rotate the film spool, in order to swing a leading end 58 of the unexposed film roll 54 on the film spool partially over the backframe opening 28 (assuming the leading end is not yet positioned over the backframe opening). The thumbwheel 34 then unwindingly rotates with the film spool 22.

4. The leading end 58 of the unexposed film roll 54 on the film spool 22 is threaded to the film supply chamber 24 and into contact with a winding tool 60. The winding tool 60 has suction holes 62 to hold the leading end 58 against the winding tool, and is rotated clockwise in FIG. 6 to prewind the filmstrip 30 from the unexposed film roll 54 on the film spool .22 to form the unexposed film roll 26 in the film supply chamber 24. The thumbwheel 34 then unwindingly rotates with the film spool 22. A trailing end (not shown) of the filmstrip 30 is left attached to the film spool 22.

5. A vacuum suction provided to the suction holes 62 of the winding tool 60 is discontinued and the winding tool is separated from the unexposed film roll 26 in the film supply chamber.

6. The rotation tool 56 is separated from the film spool 22.

7. Finally, the rear cover part 16 and the end cap or bottom lid 32 are connected to the main body part 12. When the end cap 32 is connected to the main body part 12, it pushes the film spool 22 further into the film take-up chamber 18 to a film winding position shown in FIG. 7. In the film winding position, the film spool 18 is moved against the actuator 50 to pivot the anti-backup pawl 40 at the support end connection 42 to engage the pawl end 46 with any one of the teeth 48 on the underside of the film winding thumbwheel 34. Thus, the thumbwheel 34 is no longer free for unwinding rotation.

The invention has been described with reference to a preferred embodiment. However, it will be appreciated that variations and modifications can be effected by a person of ordinary skill in the art without departing from the scope of the invention. For example, instead of the film spool 22 being used in the film take-up chamber 18, a known film cartridge can be used instead.

PARTS LIST 10. one-time-use camera
12. main body part
14. front cover part
16. rear cover part
18. film take-up chamber
20. bottom loading opening
22. film spool
24. film supply chamber
26. unexposed film roll
28. backframe opening
30. filmstrip
32. end cap
34. film winding thumbwheel
36. depending stem
38. end opening
40. anti-backup pawl
42. support end portion
44. top hole
46. pawl end
48. teeth
50. actuator
54. unexposed film roll
56. rotation tool
58. leading end
60. winding tool
62. suction holes

What is claimed is:

1. A subassembly for a one-time-use camera comprising a main body part that has a film take-up chamber adapted to receive a film spool, a film winding thumbwheel supported for winding rotation in engagement with the film spool to similarly rotate the film spool to take up an exposed filmstrip, and an anti-backup pawl engageable with said thumbwheel to prevent unwinding rotation of said thumbwheel, is characterized in that:

an actuator is movable to engage said anti-backup pawl with said thumbwheel, and is located to be moved to engage said anti-backup pawl with said thumbwheel in response to the film spool being received in said film take-up chamber;

said film take-up chamber is configured to allow the film spool to be received in said film take-up chamber in a film unwinding position for unwinding rotation of the film spool and a different film winding position for winding rotation of the film; and said anti-backup pawl is located to be moved to engage with said thumbwheel in response to the film spool being received in said film take-up chamber in the film winding position and not when the film spool is received in said film take-up chamber in the film unwinding position.

2. A subassembly as recited in claim 1, wherein said anti-backup pawl is biased to be disengaged from said thumbwheel.

3. A subassembly as recited in claim 1, wherein said anti-backup pawl is located in said film take-up chamber.

4. A subassembly for a one-time-use camera comprising a main body part that has a film take-up chamber adapted to receive a film spool and a film supply chamber for an unexposed film roll, a film winding thumbwheel supported for winding rotation in engagement with the film spool to similarly rotate the film spool to take up an exposed filmstrip, and an anti-backup pawl engageable with said thumbwheel to prevent unwinding rotation of said thumbwheel and disengageable from said thumbwheel to allow unwinding rotation of the thumbwheel to permit the film spool to be similarly rotated to unwind an unexposed filmstrip from the film spool to form the unexposed film roll, is characterized in that:

said film take-up chamber is configured to allow the film spool to be received in said film take-up chamber in a film unwinding position for unwinding rotation of the film spool and a different film winding position for winding rotation of the film spool;

said anti-backup pawl has an actuator which when actuated engages said anti-backup pawl with said thumbwheel and which is located in said film take-up chamber to allow the film spool when received in said film take-up chamber in the film winding position to actuate said actuator to engage said anti-backup pawl with said thumbwheel, but not when the film spool is received in said film take-up chamber in the film unwinding position.

5. A subassembly as recited in claim 4, wherein said anti-backup pawl is supported on said main body part.

6. A subassembly as recited in claim 4 wherein said anti-backup pawl has a pawl end for engaging said thumbwheel and is supported to permit said anti-backup pawl to be pivoted into engagement with said thumbwheel when the film spool is received in said film take-up chamber in the film unwinding position.

7. A method of engaging an anti-backup pawl with a film winding thumbwheel to prevent unwinding rotation of the thumbwheel in a onetime-use camera, said method comprising:

inserting a film spool in the camera; and moving the film spool into rotational engagement with the film winding thumbwheel and against an actuator to move the actuator to engage the anti-backup pawl with the thumbwheel.

* * * * *